United States Patent [19]
Placek

[11] 3,975,140
[45] Aug. 17, 1976

[54] SPACE HEATER

[75] Inventor: Eugene W. Placek, Middleburg Heights, Ohio

[73] Assignee: International Magna Corporation, Cleveland, Ohio

[22] Filed: Aug. 28, 1974

[21] Appl. No.: 501,241

[52] U.S. Cl. .............................. 431/329; 126/92 B
[51] Int. Cl.² ........................................ F23D 13/14
[58] Field of Search .................... 431/329; 126/92 B

[56]  References Cited
UNITED STATES PATENTS

| | | | |
|---|---|---|---|
| 3,204,683 | 9/1965 | Ruff et al. | 431/329 |
| 3,291,187 | 12/1966 | Haensel | 431/329 |
| 3,407,025 | 10/1968 | Hardison | 431/329 |

Primary Examiner—Carroll B. Dority, Jr.
Attorney, Agent, or Firm—Allen Owen

[57] ABSTRACT

Space heaters employing an omnidirectional infrared radiant burner are disclosed. Cylindrical in shape, the radiant burner includes an inner cylindrical mantle comprised of three concentric fine-mesh grids which are formed from flat mesh stock. The outer of the mantle grids has a seam which is bonded to form a continuous cylinder, while the inner grids each have the shape of a split O with an open break line therein. The inner two concentric mantle grids are inserted inside the outer bonded grid, which retains them against their tendency to spring outwardly. Concentrically outward from the mantle is a larger mesh outer grid defining a radiant element, both the mantle and outer grid being retained by a pair of end caps having inner and outer annular flanges. In the lower end cap is an inlet opening for air and fuel and across the opening is a very fine mesh grid which causes turbulence and insures proper mixing of the air and fuel. The two opposed end caps are retained together by axially extending pins.

2 Claims, 6 Drawing Figures

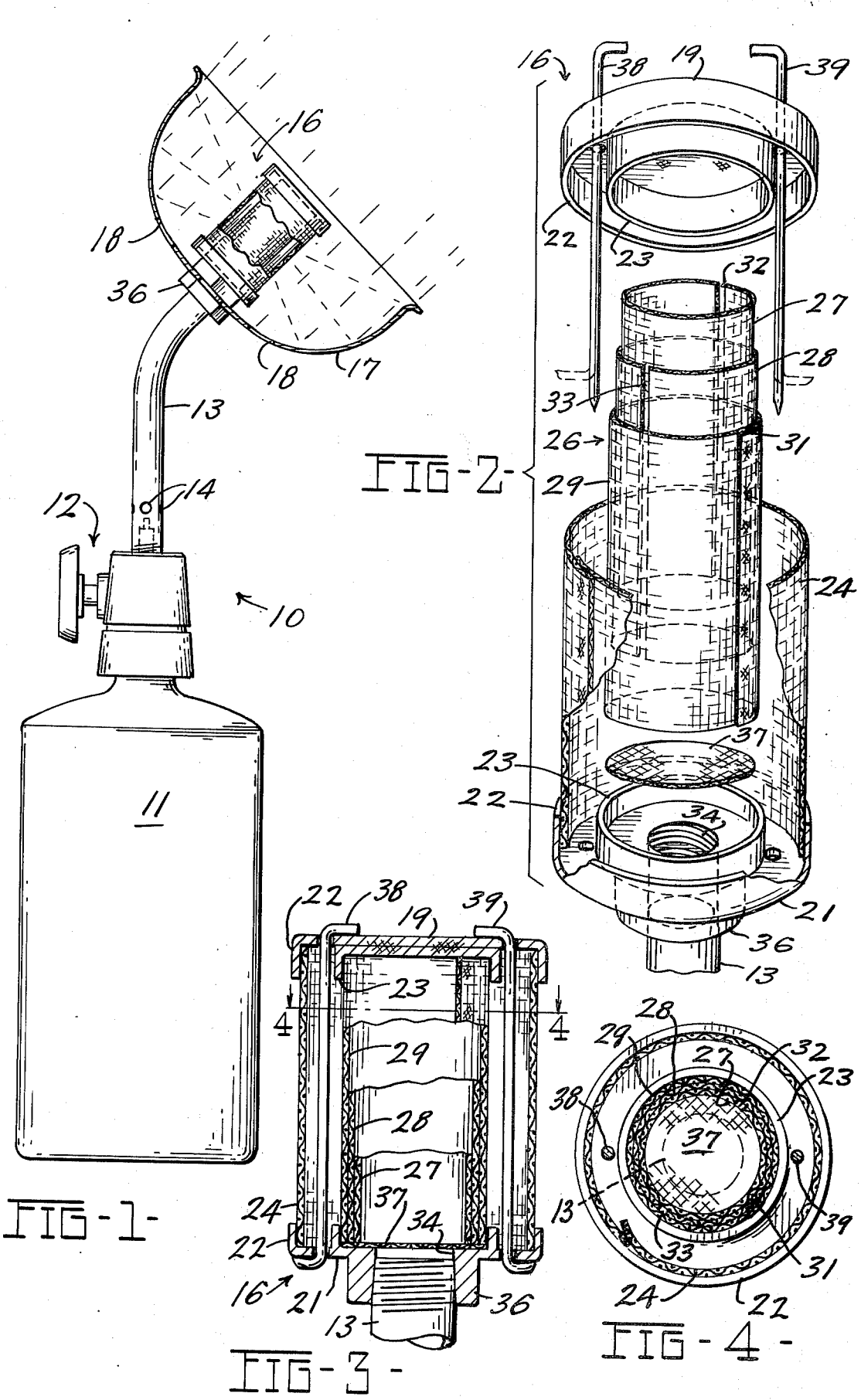

U.S. Patent Aug. 17, 1976 Sheet 2 of 2 3,975,140
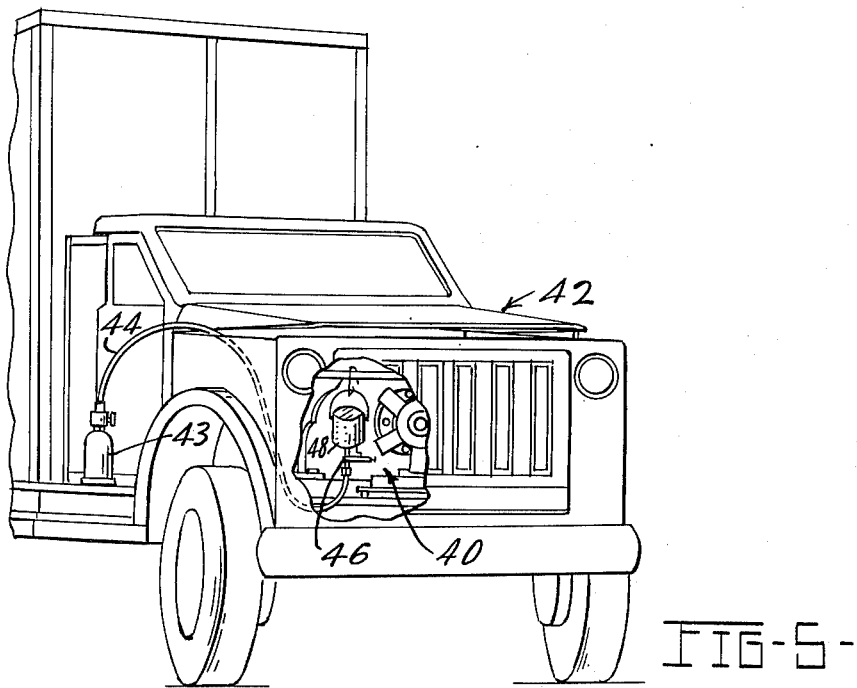
FIG-5-
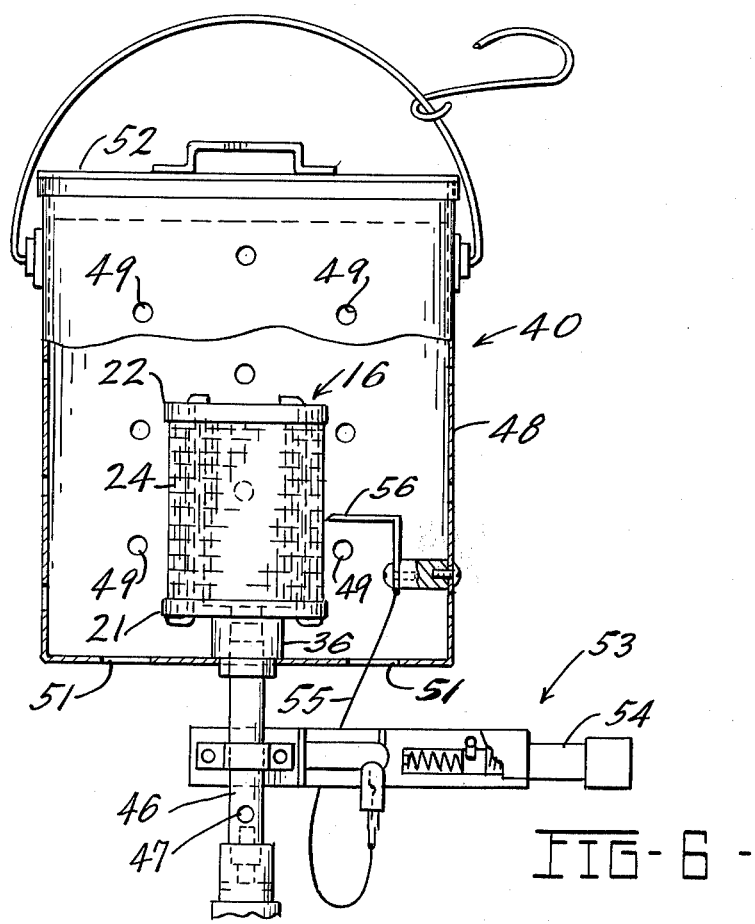
FIG-6-

3,975,140

SPACE HEATER

BACKGROUND OF THE INVENTION

The invention relates to infrared radiant burners, and more particularly to an omnidirectional cylindrical radiant burner for use in space heaters.

The type of heater to which this invention relates is disclosed in U.S. Pat. Nos. 3,040,805, 3,129,749, 3,198,240 and 3,310,098. Such a device generally burns a fuel such as propane from a pressurized source mixed with air in a combustion chamber defined by an inner mantle element and an outer grid. The mantle usually comprises a series of overlaid fine wire grids, the coarser outer grid or radiant element being spaced therefrom. Combustion takes place within and adjacent to the fine wire grids of the mantle element. So complete is the combustion that only traces of gases other than carbon dioxide, nitrogen and water vapor are expelled.

Omnidirectional cylindrical radiant heat generators of the type disclosed herein are known and have been employed in various types of heaters such as camping heaters and other small space heaters. Such space heaters are often designed to utilize convection as well as radiation in the transfer of heat from the cylindrical infrared heat generator.

Existing cylindrical infrared burners have had certain shortcomings. The small plenum chamber defined interior of the cylindrical mantle has generally been incapable of adequately mixing air and fuel and sufficiently dispersing the mixture equally through all areas of the mantle. The high velocity of the fuel and air entering the plenum chamber often results in a "flue effect" wherein the mixture tends to flow in a central stream without adequate outward dispersion. The result is that uneven and inefficient combustion occurs with some unburned gases entering the air. Aggravating this problem and also adding to construction costs in the manner in which the mantle grids are usually assembled. Each of the mantle grids generally has some kind of longitudinal seam which may be lapped and welded or interwoven. These seams create areas of resistance and result in cold spots on the otherwise hot glowing mantle.

Another feature of construction in cylindrical burners that may add unnecessary production costs and may result in less efficiency in burning is the manner in which the end caps of the burner are retained together. The fastening means must be simple and relatively unobtrusive to the passage of radiant heat outward from the mantle. Present burner constructions generally fall short of these requirements.

SUMMARY OF THE INVENTION

The present invention provides an omnidirectional cylindrical infrared heater which is simple and economical in construction and which achieves an even, efficient burning due to thorough fuel-air mixing and even dispersion of the mixture through the mantle grids.

The cylindrical burner of the invention employs a very fine mesh diffuser screen across its fuel-air inlet opening to create turbulence and reduce the velocity of the incoming gases, thereby giving them ample opportunity to mix thoroughly within the plenum chamber interior of the mantle. An improved mantle grid construction aids in the even dispersion of gases therethrough. Only the outer or reverberator mantle grid is bonded together in a longitudinal seam, either by welding or intermeshing of the grid wires. The inner and middle grids, generally termed the primary and combustion grids, respectively, are not complete cylinders but each include a longitudinal gap rather than a seam, defining a split O shape. The combustion grid is slipped inside the closed reverberator grid, and the primary grid is likewise slipped inside the combustion grid, with the break lines of these grids circumferentially staggered from one another and from the seam in the reverberator grid. A minimum of resistance areas and cold spots result from this mantle construction.

The upper and lower end caps of the present cylindrical burner are retained together by longitudinally extending pins positioned just inside the coarse outer grid. The retention pins extend through the upper and lower end caps and are crimped over them to provide a simple but effective retaining means. The positioning of the retention pins results in a minimum resistance to the outward radiation of heat. In addition, the retention pins as well as all other components of the cylindrical burner are made from metals having the same coefficient of thermal expansion so that thermal expansion and contraction, which can be as high as 10%, occur evenly throughout the burner.

As in prior art cylindrical burners, the upper cap of the present burner becomes an infrared radiating surface at full warmup, while the inner cap assembly remains relatively cool due to the cooling effect of high-velocity fuel and air passing through the mesh diffuser screen.

The cylindrical radiant burner of the invention may be included in a small space heater such as the camping type and so arranged to expel heat both by radiation and convection. A bell-shaped polished reflector surrounding the burner provides reflection for radiant heat. If the reflector is directed in an upward direction and holes are provide in its backside adjacent the burner, convection heating will also result. The holes will also provide for overboil drainage when the burner is used face up as a portable cooker.

The burner of the invention may also be employed in a purely convection heater. Such a space heater may be used as an engine warmer for vehicles in cold climates, for example. In this form of the invention, the cylindrical burner is positioned inside a larger closed cylindrical container having air intake holes at its bottom and hot air outlet holes around its periphery.

BRIEF DESCRIPTION OF THE DRAWINGS

FIG. 1 is an elevational view of a space heater according to the invention;

FIG. 2 is an exploded view of an infrared radiant burner incorporated in the space heater of FIG. 1;

FIG. 3 is a sectional elevational view of the burner;

FIG. 4 is a sectional plan view of the burner taken along the line 4—4 of FIG. 3;

FIG. 5 is a perspective view of another space heater being used to keep a vehicle engine warm; and FIG. 6 is a sectional elevational view of the space heater of FIG. 5, showing an infrared radiant burner similar to that of FIGS. 2 through 4.

DESCRIPTION OF THE PREFERRED EMBODIMENT

In the drawings, FIG. 1 shows a space heater 10 including a fuel tank 11 which preferably contains pressurized propane gas. A valve 12 regulates the flow of gas through a line 13 having air intake bores 14 which admit primary air to the expanding gas as it travels up the line 13. At the other end of the line 13 is a cylindrical radiant burner 16 surrounded by a polished bell-shaped reflector 17 which is also fastened to the upper end of the line 13. A circular array of air intake bores 18 is provided in the reflector around the burner 16 so that the heater 10 emits heat both by convection out of the open face of the reflector and by radiation.

FIG. 2 is an exploded view showing the manner of construction of the cylindrical radiant burner 16. Upper and lower end caps 19 and 21 having outer and inner flanges 22 and 23, respectively, retain a plurality of grids in their respective positions. The grids include an outer grid or radiant element 24 retained within the outer flanges 22, and three concentric grids defining a mantle 26 retained by the inner flanges 23: a primary grid 27, a combustion grid 28 and a reverberator grid 29. As FIG. 2 indicates, the only mantle grid which is joined together in a seam 31 is the reverberator grid 29. The seam 31 may comprise a welded butt seam or lap seam or simply an intermeshed lap seam. The grids 27 and 28, on the other hand, are not sealed together and do not abut or overlap themselves, but have open gaps or break lines 32 and 33, forming split O shapes as seen in FIGS. 2 and 4. The break lines 32 and 33 are circumferentially staggered from each other and from the seam 31 on the reverberator grid 29. Since the grids 27 and 28 are rolled from flat grid material, they have a tendency to spring outwardly and expand against the reverberator grid 29. This keeps the three grids tightly retained together without the use of any fastening means except the seam 31 on the reverberator grid 29.

As FIG. 2 also indicates, the radiant burner 16 includes on its lower end cap 21 an inlet opening and connection means 36 for fuel and air from the fuel line 13. Positioned across the opening 34 within the inner flange 23 of the lower end cap 21 is a very fine mesh screen 37 which serves to impart turbulence to and to lower the velocity of the incoming air and fuel, thereby aiding in fuel mixing.

With the grids assembled in place within the flanges of the upper and lower end caps 19 and 21, the end caps are retained together by a pair of retention pins 38 and 39 which pass through both end caps and are preferably crimped over to engage the outer surfaces thereof, as shown in FIGS. 2 and 3. The pins may include threaded end fastening means rather than crimped ends. The assembled cylindrical radiant burner 16 is shown in FIGS. 3 and 4. The pins 38 and 39 are preferably made from the same type of steel as the grids or from a material having the same coefficient of thermal expansion. When the grids expand axially as the temperature of the burner rises, the pins will allow the end caps 19 and 21 to move away from each other to accommodate the expanded grids.

FIGS. 5 and 6 show the cylindrical infrared burner 16 employed in another space heater 40. As FIG. 5 indicates, the space heater 40 may be employed to keep the engine of a vehicle 42 warm in a cold climate. A tank of pressurized propane fuel 43 feeds fuel to the burner 40 through a flexible line 44 which leads to a rigid line 46 connected into the lower end cap of the burner 16.

As seen in FIG. 6, the rigid fuel line 46 includes air inlet openings 47 which introduce primary air into the flowing gaseous fuel. The space heater 40, which heats by convection, includes a can-like outer casing 48 which has a plurality of holes 49 around its periphery for expelling air heated by the burner 16. In the bottom of the casing 48 are cold air intake holes 51. An asbestos cover 52 may be provided as an upper closure for the casing 48, since the heat of the rising hot air is most intense in this area.

The space heater 40 draws cool air and expels hot air by convection, but inside the casing 48 the air is heated by both conduction and radiation. Complete combustion of the fuel and make-up air drawn from the openings 47 takes place among the wire grids of the burner 16. Air entering the casing 48 from the lower openings 51 is heated partly by radiant energy from the burner 16 and partly by actual contact with the wire grids of the burner. Convection forces the heated air to exit the openings 49 in the casing 48.

The space heater of FIG. 6 also includes a spark-ignitor 53. The ignitor 53 is of a known type which utilizes piezoelectric crystals and a spring-loaded plunger 54 to generate a high voltage current. The current passes through a lead wire 55 and spark tip 56, from which it jumps to the outer grid 24 of the burner 16 which is grounded to the body of the ignitor 53. Fuel and air passing through the grid 24 are ignited by the spark.

The above described preferred embodiment provides improved space heaters employing an omnidirectional cylindrical radiant burner of novel construction which results in more efficient and safer burning as well as significant production cost saving. Various other embodiments of the present invention will be apparent to those skilled in the art and may be made without departing from the spirit and scope of the following claims.

I claim:

1. An omnidirectional infrared heat generator, comprising:
   upper and lower end caps each having outer and inner circular flanges extending axially inwardly, said lower end cap including a central opening and means for connecting the opening to a source of fuel and air;
   a fuel-air mixing screen positioned across said opening in said lower end cap;
   a mantle comprising a plurality of concentric cylindrical wire grids retained by and extending between the upper and lower inner flanges of the end caps, the outer of said concentric grids having a bonded axially extending seam, the inner grids of said plurality having circumferences of less than 360°, with axially extending gaps defined therein;
   an outer cylindrically wrapped grid retained by and extending between said outer flanges of said upper and lower end caps; and
   means for retaining said upper and lower end caps about said grids, comprising a plurality of axially extending pins extending from said upper end cap to said lower end cap between said inner and outer flanges, said pins passing through the upper and lower end caps, and means at the ends of said pins for engaging the outer surfaces of said upper and lower end caps.

2. An omnidirectional infrared heat generator, comprising:
   upper and lower end caps each having outer and inner circular flanges extending axially inwardly, said lower end cap including a central opening means for connecting the opening to a source of fuel and air;

a mantle comprising a plurality of concentric cylindrical wire grids retained by and extending between the upper and lower inner flanges of the end caps, the outer of said concentric grids having a bonded axially extending seam, the inner grids of said plurality having circumferences of less than 360°, with axially extending gaps defined therein;

an outer cylindrically wrapped grid retained by and extending between said outer flanges of said upper and lower end caps; and means for retaining said upper and lower end caps about said grids, comprising a plurality of axially extending pins passing through said upper end cap and extending through said lower end cap between said inner and outer flanges, and means at the ends of said pins for engaging the outer surfaces of said upper and lower end caps.

* * * * *